United States Patent
Wang et al.

(10) Patent No.: US 6,766,214 B1
(45) Date of Patent: Jul. 20, 2004

(54) ADJUSTING A SAMPLING RATE BASED ON STATE ESTIMATION RESULTS

(75) Inventors: Jin Wang, Austin, TX (US); Brian K. Cusson, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 10/406,675

(22) Filed: Apr. 3, 2003

(51) Int. Cl.$^7$ .......................... G06F 19/00; H01L 21/66
(52) U.S. Cl. ........................... 700/121; 700/109; 438/7; 438/14; 702/84
(58) Field of Search .............................. 700/121, 109; 438/7, 14; 702/84

(56) References Cited

U.S. PATENT DOCUMENTS

| | | | |
|---|---|---|---|
| 6,192,103 B1 * | 2/2001 | Wormington et al. | 378/73 |
| 6,248,602 B1 * | 6/2001 | Bode et al. | 438/14 |
| 6,368,883 B1 * | 4/2002 | Bode et al. | 438/14 |
| 6,405,096 B1 * | 6/2002 | Toprac et al. | 700/121 |
| 6,460,002 B1 * | 10/2002 | Bone et al. | 702/81 |
| 6,528,331 B1 * | 3/2003 | Bode et al. | 438/14 |
| 6,535,774 B1 * | 3/2003 | Bode et al. | 700/109 |
| 6,589,800 B2 * | 7/2003 | Patel et al. | 438/14 |
| 6,607,926 B1 * | 8/2003 | Toprac et al. | 438/7 |
| 6,622,061 B1 * | 9/2003 | Toprac et al. | 700/121 |

* cited by examiner

*Primary Examiner*—Leo Picard
*Assistant Examiner*—Douglas S. Lee
(74) *Attorney, Agent, or Firm*—Williams, Morgan & Amerson, P.C.

(57) ABSTRACT

A method and an apparatus are provided for adjusting a sampling rate based on a state estimation result. The method comprises receiving metrology data associated with processing of workpieces, estimating a next process state based on at least a portion of the metrology data and determining an error value associated with the estimated next process state. The method further comprises processing a plurality of workpieces based on the estimated next process state and adjusting a sampling protocol of the processed workpieces that are to be measured based on the determined error value.

28 Claims, 3 Drawing Sheets

ADJUSTING A SAMPLING RATE BASED ON STATE ESTIMATION RESULTS

BACKGROUND OF THE INVENTION

1. Field of the Invention

This invention relates generally to an industrial process, and, more particularly, to adjusting a sampling rate of processed workpieces based on state estimation results.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial improvements.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an Advanced Process Control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, particle contamination, film optical properties, film thickness, film uniformity, etc., all may potentially affect the end performance of the device. Various tools in the processing line are controlled in accordance with performance models to reduce processing variation. Commonly controlled tools include photolithography steppers, polishing tools, etching tools, and deposition tools, etc. Pre-processing and/or post-processing metrology data is supplied to process controllers for the tools. Operating recipe parameters, such as processing time, are calculated by the process controllers based on the performance model and the metrology data to attempt to achieve post-processing results as close to a target value as possible. Reducing variation in this manner leads to increased throughput, reduced cost, higher device performance, etc., all of which equate to increased profitability.

Run-to-run control in semiconductor manufacturing is a type of batch control, where a batch may be as small as one wafer or as large as several lots of wafers. The standard output of a run-to-run controller is a process recipe. This recipe defines the set points for "low-level" controllers built into the processing tool. In this way, the run-to-run controller supervises the tool controller by specifying required values for process variables such as temperature, pressure, flow, and process time. The tool controller initiates the activities necessary to maintain these variables at the requested values.

A run-to-run control setup may include a feedback loop where adjustments are made to the recipe parameters based on batch properties measured after processing. Generally, to control the processing of the wafer(s), it is desirable to know the "process" state (e.g., the processing tool state, wafer state, etc.) to process the next batch of wafers. The "process" state, however, is typically not measured directly but rather estimated based on the measurements from previously processed wafers. Because of time and cost issues, every wafer in the batch may not be measured. For example, in some implementations, the output characteristics of one out of every five processed wafers are measured. However, because the process state is estimated based on the measurements from previously processed wafers, the number of sample measurements considered can affect the accuracy of the estimation of the process state. The accuracy of the estimated process state in turn can affect how well the process can be controlled to achieve the desired target or goal. Thus, there is a need for a way of adjusting the number of sample measurements that are desired to control the process to achieve the desired objectives.

The present invention is directed to overcoming, or at least reducing the effects of, one or more of the problems set forth above.

SUMMARY OF THE INVENTION

In one embodiment of the present invention, a method is provided for adjusting a sampling rate based on a state estimation result. The method comprises receiving metrology data associated with processing of workpieces, estimating a next process state based on at least a portion of the metrology data and determining an error value associated with the estimated next process state. The method further comprises processing a plurality of workpieces based on the estimated next process state and adjusting a sampling protocol of the processed workpieces that are to be measured based on the determined error value.

In another embodiment of the present invention, an apparatus is provided for adjusting a sampling rate based on a state estimation result. An apparatus comprising an interface communicatively coupled to a control unit. The interface is adapted to receive metrology data associated with processing of workpieces. The control unit is adapted to estimate a next process state based on at least a portion of the metrology data, determine an error value associated with the estimated next process state and process a plurality of workpieces based on the estimated next process state. The control unit is further adapted to adjust a sampling protocol of the processed workpieces that are to be measured based on the determined error value.

In a further embodiment of the present invention, an article comprising one or more machine-readable storage media containing instructions is provided for adjusting a sampling rate based on a state estimation result. The one or more instructions, when executed, enable the processor to receive metrology data associated with processing of workpieces, estimate a next process state based on at least a portion of the metrology data and determine an error value associated with the estimated next process state. The one or more instructions, when executed, further enable the processor to process a plurality of workpieces based on the estimated next process state and adjust a number of the processed workpieces that are to be measured based on the determined error value.

In a further embodiment of the present invention, a system is provided for adjusting a sampling rate based on a state estimation result. The system comprises a controller and a processing tool. The controller is adapted to receive metrology data associated with processing of workpieces, estimate a next process state based on at least a portion of the metrology data and determine an error value associated with the estimated next process state. The processing tool processes a plurality of workpieces based on the estimated next process state. The controller is adapted to adjust a number of the processed workpieces that are to be measured based on the determined error value.

BRIEF DESCRIPTION OF THE DRAWINGS

The invention may be understood by reference to the following description taken in conjunction with the accompanying drawings, in which like reference numerals identify like elements, and in which.

Figure 1:
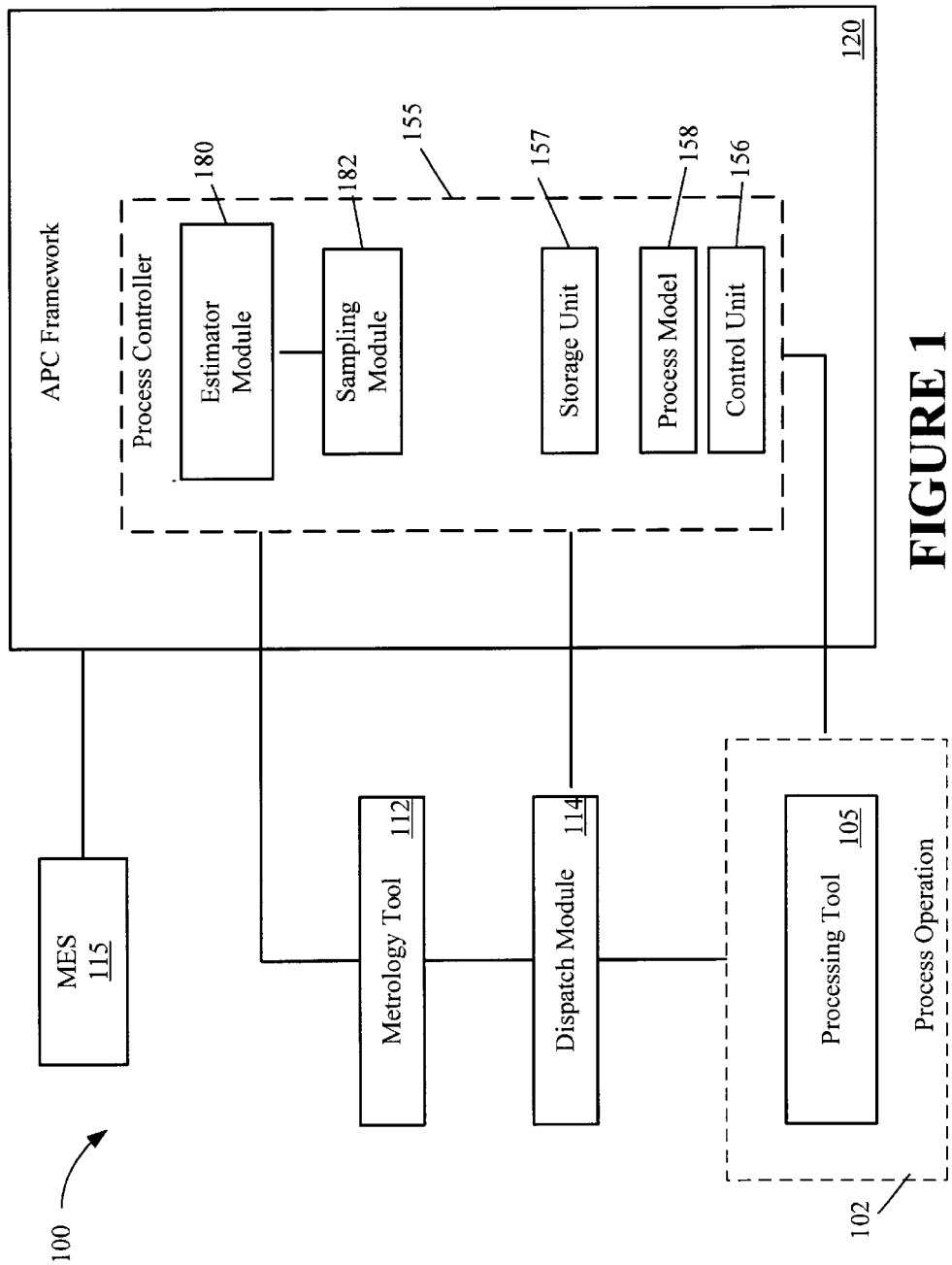
FIG. 1 illustrates a block diagram of an industrial system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a system 100 is illustrated, in accordance with one embodiment of the present invention.

The system 100, in the illustrated embodiment, may perform at least one process operation 102, which may be an industrial process, such as a semiconductor fabrication process, a photographic process, a chemical process, or any other process in which the process state(s) or process output may vary with time.

In the system 100, the process operation 102 may be performed using one or more processing tools 105. Generally, the particular type of process operation 102 that is performed, and the type of processing tool(s) 105 employed in that process operation 102, depends on the particular implementation. For example, in the context of a chemical industrial process, the process operation 102 may include processing a polymer. In the context of a photographic process, the process operation 102 may, for example, include processing a film.

For illustrative purposes, the process operation 102 depicted in FIG. 1 is at least a portion of a semiconductor fabrication process, which, for example, may be part of an overall semiconductor process flow. Examples of the process operation 102 may be an etch process, deposition process, chemical mechanical planarization (CMP), and the like. The processing tool 105, in the illustrated embodiment, may take the form of any semiconductor fabrication equipment used to produce a processed workpiece, such as a silicon wafer. The semiconductor process may be utilized to produce a variety of integrated circuit products including, but not limited to, microprocessors, memory devices, digital signal processors, application specific integrated circuits (ASICs), or other similar devices. An exemplary processing tool 105 may include an exposure tool, an etch tool, a deposition tool, a polishing tool, a rapid thermal anneal processing tool, a test-equipment tool, an ion implant tool, a packaging tool and the like.

In the system 100 of FIG. 1, the process operation 102 may be performed using one or more processing tools 105. The system 100 may include one or more metrology tools 112 for measuring one or more of a variety of aspects of the workpieces (e.g., wafers) that are processed in the process operation 102. The metrology tool 112, in one embodiment, may be capable of measuring aspects of the workpieces off-line, in-line, or a combination thereof. In the illustrated embodiment, a dispatch module 114 indicates the number of workpieces that are provided to the metrology tool 112 for measurements.

In accordance with one or more embodiments of the present invention, and as is described in greater detail below, the dispatch module 114 adjusts the measurement frequency of the processed workpieces based on the results of the process state estimation. Depending on the process state estimation results, the dispatch module 114 may increase the sampling frequency, decrease the sampling frequency, or leave it unchanged. As utilized herein, adjusting the "sampling frequency" may include increasing/decreasing the number of workpieces (e.g., wafers) whose output characteristics are measured or it may include increasing/decreasing the number of measurements taken from a given workpiece or workpieces or it may include both.

The manufacturing system 100 may include a manufacturing execution system (MES) 115 that is coupled to the APC framework 120. The manufacturing execution system 115 may, for example, determine the processes that are to be performed by the processing tool 105, when these processes are to be performed, how these processes are to be performed, etc. In the illustrated embodiment, the manufacturing execution system 115 manages and controls the overall system through the APC framework 120.

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The APC framework 120 includes at least one process controller 155 that, through a feedback and/or feedforward process, aids the processing tool 105 towards performing a desired process to thereby achieve a desired result. The process controller 155 in the illustrated embodiment includes a control unit 156, a storage unit 157, and a process model 15 158 that is storable in the storage unit 157. The process controller 155, based at least on an input from an estimator module 180, uses the process model 158 to determine the next control move for the processing tool 105. The particular control actions taken by the process controller 155 depend on the particular processes performed by the processing tool 105, and the output from the estimator module 180.

The process model 158 may be developed empirically using commonly known linear or non-linear techniques. The process model 158 may be a relatively simple equation-based model (e.g., linear, exponential, weighted average, etc.) or a more complex model, such as a neural network model, principal component analysis (PCA) model, partial least squares projection/latent structures (PLS) model, or the like. The specific implementation of the process model 158 may vary depending on the modeling techniques selected and the process being controlled. The process controller 155, in one embodiment, maintains incoming "state" information associated with the process operation 102, where the "state" information may be based at least in part on the characteristics (i.e., wafer state data) of the wafer selected for gathering metrology data and/or state information known about the controlled processing tool 105 (i.e., tool state data). The term "process" state is used herein to denote the "workpiece" state and/or the "processing" tool state.

In accordance with one embodiment of the present invention, the process controller 155 includes a sampling module 182. As described in greater detail below, the sampling module 182 provides an indication to the dispatch module 114 to adjust the sampling frequency of the processed wafers based on at least the process state estimation results of the estimator module 180.

The estimator module 180 estimates the next tool state of the processing tool 105 (or the next processing state) based on metrology data associated with a previously processed workpiece and a previously estimated state. The term "next tool state," as utilized herein, refers to the state of the processing tool 105 before the next batch of workpieces is processed.

Based on the estimated next tool state, the process controller 155 generates the next recipe or control move for the processing tool 105. For example, in the context of an etching process, the estimator module 180 estimates an etch rate of the processing tool 105 based on the received metrology data (e.g., etch depth), and the process controller 155 then determines an etch time (i.e., recipe) that the processing tool 105 should etch the next workpiece (e.g., wafer) based on the estimated etch rate.

For illustrative purposes, the estimator module 180 is described in the context in which the process operation 102 is an etch process and the processing tool 105 is an etch tool. It should, however, be understood that the application of the estimator module 180 is not limited to this illustration and that it may be applicable to any desired industrial process. In the illustrated embodiment, the estimator module 180 uses a state space model that describes the system dynamics of the etching process depicted by the process operation 102 of FIG. 1. For illustrative purposes, it is herein assumed that the dynamic behavior of the etch rates of the processing tool 105 can be described using a linear drift model shown in equations (1) and (2):

$$x(k+1)=Ax(k)+v(k), \qquad (1)$$

$$y(k)=Cx(k)+w(k), \qquad (2)$$

where exemplary values of A and C may be $$A = \begin{bmatrix} 1 & 1 \\ 0 & 1 \end{bmatrix} \text{ and } C = [\,1 \;\; 0\,].$$

In the illustrated example, $$x(k) = \begin{bmatrix} x_1(k) \\ x_2(k) \end{bmatrix},$$

and thus comprises two states, an etch rate state $x_1(k)$ and a slope of the drift state $x_2(k)$. In the above equations, y(k) represents the output measurement (e.g., actual measured etch rate), v(k) represents the process noise term, and w(k) represents the measurement noise.

The estimator module 180 in the illustrated embodiment includes a Kalman filter for predicting the next state of the processing tool 105 or predicting the next processing state. In alternative embodiments, other filters or filtering techniques may be employed to predict the next process or tool states. Because the estimator module 180 includes a Kalman filter, the general form of the steady-state of the filter (based on the state space model shown in equations (1) and (2)) is illustrated by equation (3):

$$\hat{x}[k+1]=A\hat{x}[k]+J[k](y[k]-C\hat{x}[k]), \qquad (3)$$

where $\hat{x}(k)$ is the estimate of x(k), and J[k] is the Kalman filter gain. As shown in equation (3), the next estimate process state, $\hat{x}(k+1)$, is typically calculated based on the previous state estimate, $\hat{x}(k)$, and measurement, y(k).

The Kalman filter gain, J[k], of equation (3) is defined in equation (4):

$$J[k]=AP[k]C^T(R+CP[k]C^T)^{-1} \qquad (4)$$

The Kalman filter gain, J[k], can be calculated by solving the Algebraic Riccati equation for P, where P, which represents the error variance, is defined by equation (5):

$$P[k+1]=A(P[k]-P[k]C^T(R0+CP[k]C^T)^{-1}CP[k])A^T+Q \qquad (5)$$

In the illustrated example, Q and R are covariance matrices of w(k) and v(k), respectively, where Q and R describe the noise terms associated with process or process operation 102.

When a workpiece measurement is not available (or taken), then typically only the deterministic part of the process model can be used to update the process state (i.e., x[k+1]=Ax[k] and y[k]=Cx[k]), where the corresponding next state and estimate error variance are respectively $\hat{x}[k+1]=A\hat{x}[k]$ and $P[k+1]=AP[k]A^T+Q$. Thus, when no workpiece measurement(s) is/are available, the estimate error variance continues to increase and approach infinity as time approaches infinity. The output noise variance affects the speed with which P[k] increases.

In estimating the next state of the processing tool 105, the Kalman filter of the estimator module 180 takes into account the noise terms, such as process noise and metrology noise, using the Q and R covariance matrices. In the illustrated example, the Q matrix relates to the measurement noise (e.g., measurement error due to a metrology tool, human, and the like) and the R matrix relates to the process noise (e.g., step disturbance, power instability, and the like). The size of the Q and R matrices may vary (e.g., 2×2, 4×4, 100×100 matrices), depending on how many inputs and outputs are monitored for a given process. In the Q and R matrices, a different priority number (or value) may be assigned to a process input to account for the noise associated with that input.

In the illustrated embodiment, the process controller 155 is computer programmed with software to implement the functions described. However, as will be appreciated by those of ordinary skill in the art, a hardware controller designed to implement the particular functions may also be used. Moreover, the functions performed by the process controller 155, as described herein, may be performed by multiple controller devices distributed throughout a system. Additionally, the process controller 155 may be a stand-alone controller, resident in the processing tool 105, or part of a system controlling operations in an integrated circuit manufacturing facility. The term "module," as utilized herein, may be implemented in software, hardware, or any combination thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

It should be understood that the illustrated components shown in the block diagram of the system 100 in FIG. 1 are illustrative only, and that, in alternative embodiments, additional or fewer components may be utilized without deviating from the spirit or scope of the invention. As an example, in one embodiment, the various components of the system 100 may communicate with each other without the APC framework 120. As an additional example, in one embodiment, the processing tool 105, metrology tool 112, and/or MES 115 may each interface with the APC framework 120 through an associated equipment interface (not shown). Additionally, it should be noted that although various components, such as the dispatch module 114 of the system 100 of FIG. 1 are shown as stand-alone components, in alternative embodiments, such components may be integrated with other components of the system 100.

Figure 2:
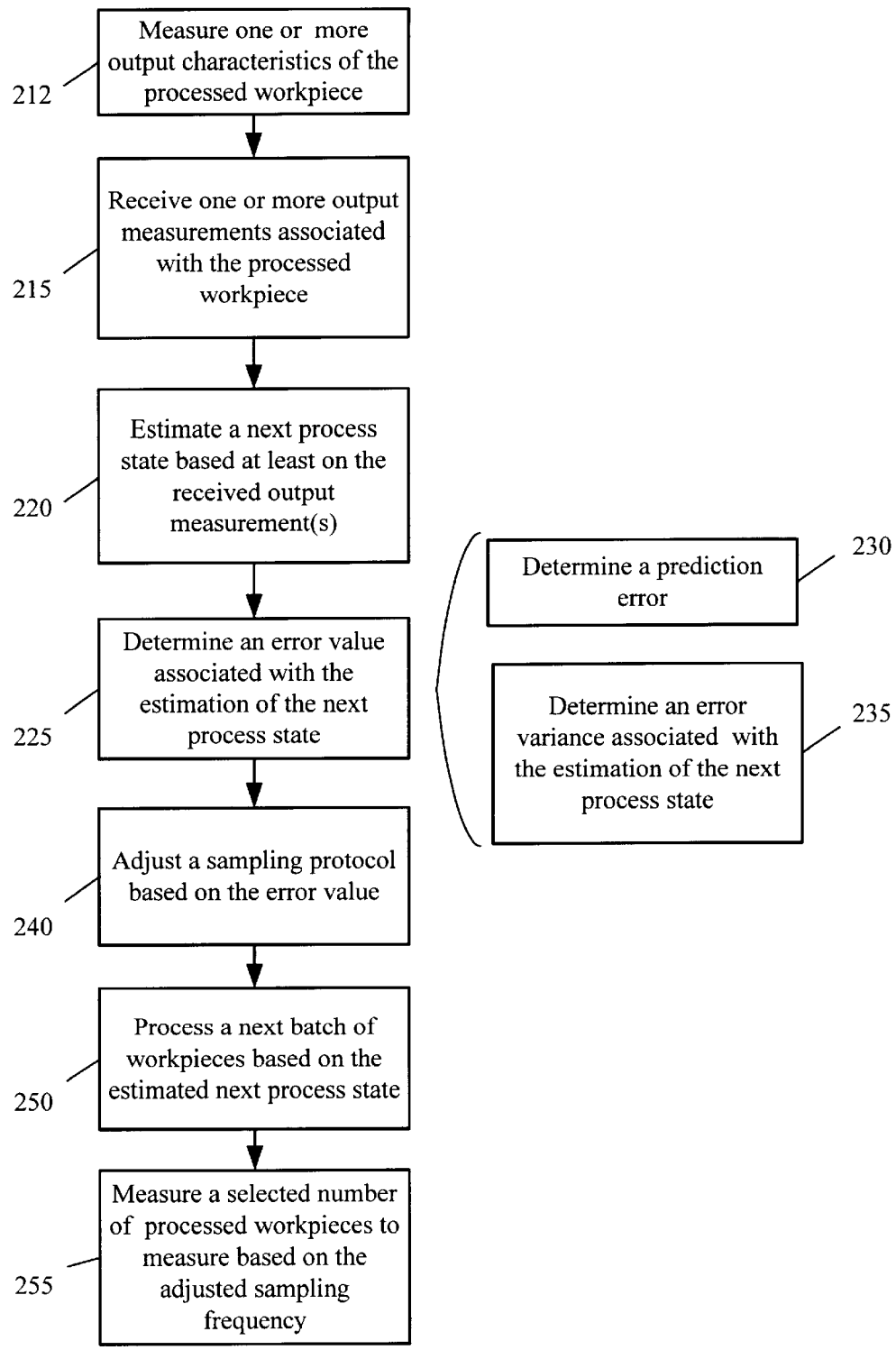
FIG. 2 illustrates a flow diagram of a method that may be implemented in the industrial system of FIG. 1, in accordance with one embodiment of the present invention.

Referring now to FIG. 2, a flow diagram of a method that may be implemented in the manufacturing system 100 of FIG. 1 is illustrated, in accordance with one embodiment of the present invention. For illustrative purposes, the method of FIG. 2 is described in the context of an etch process. In particular, the method of FIG. 2 illustrates the exemplary steps performed in association with a given process run. These steps may be repeated as desired for each process run.

In the manufacturing system 100, after (or as) a first batch of workpieces are processed by the processing tool 105, the metrology tool 112 (or an in-situ metrology tool) measures (at 212) one or more output characteristics of the processed workpiece. In the context of an etch process, the metrology data may, for example, include the critical dimension, profile and/or etch depth of the features formed on the processed wafer. The metrology data is provided to and received by (at 215) the estimator module 180 of the process controller 155.

The estimator module 180 estimates (at 220) a next process state. In the described context of an etch process, the next process state is an etch rate. In one embodiment, the estimator module 180 may estimate the next process state, $\hat{x}(k+1)$, using equation (3) above. Based on the estimated etch rate, the process controller 155 determines a control move (e.g., etch time) for the processing tool 105. Generally, the accuracy of the estimated process state affects how well the process can be controlled to achieved the desired target or goal.

The estimator module 180 determines (at 225) an error value associated with the estimation of the next process state (at 220). The error value, in one embodiment, may be indicative of how close the estimated process state is to the actual state of the processing tool 105. That is, a relatively high error value may indicate that the estimated process state value, which is utilized by the process controller 155 to determine the next control move, is not representative of the actual process state, and thus may produce larger-than-expected deviations in the process results. Conversely, a relatively small error value may indicate that the estimated process state value is close to the actual process state value. Any one of a variety of error values may be determined (at 225). For example, the estimator module 180 may determine a prediction error value (at 230) that represents the difference between the measured output characteristic of a processed workpiece and the intended target value. If more than one prediction error value is calculated (one for each measured workpiece, for example), then, in one embodiment, the plurality of calculated error values may be combined (e.g., averaged) to arrive at a composite error value. The difference may then be determined between the composite value and the target value to ascertain the prediction error value (at 230).

In one embodiment, the estimator module 180 may determine an error variance value (at 235) that is associated with the estimation of the process state (at 220). Assuming that the estimator module 180 employs equation (3) to estimate the next process state, the error variance value associated with that estimation of the next process state may be calculated by solving for P using equation (5) above.

Based on the determined error value (at 225), the sampling module 182 (see FIG. 1) adjusts (at 240) a sampling protocol of the processed workpieces that are to be measured. Adjusting the sampling protocol (at 240) may include adjusting the sampling frequency of the processed workpieces that are to be measured, a number of features formed on the processed workpieces that are to be measured, and/or a type of features that are to be measured.

In one embodiment, the sampling protocol may be adjusted by indicating to the dispatch module 114 to increase or decrease the number (or type) of sample measurements that are desired from the processed workpieces. If no changes to the sampling frequency are desired, then the sampling module 182 may indicate as such to the dispatch module 114 or, alternatively, provide no indication to the dispatch module 114, thus signifying that no change is desired to the sampling frequency. One embodiment of the act of adjusting the sampling protocol (at 240) is illustrated in FIG. 3, which is described later.

In FIG. 2, the processing tool 105 processes (at 250) a next batch of workpieces based on the estimated next process state. In the context of an etch process, the processing tool 105 etches a wafer based on the recipe (or control move) that is generated based on the estimated etch rate.

The metrology tool 112 measures (at 255) a selected number of processed workpieces based on the adjusted sampling protocol (at 240). Thus, for example, if the sampling module 182 increases the sampling frequency (at 240), the metrology tool 112 may take more measurements than were taken during one or more of the previous process runs. The metrology tool 112 may take more measurements, for example, by increasing the number of processed workpieces that are sampled, increasing the number of features of the processed workpieces that are measured, or a combination thereof. In other instances, as explained above, the metrology tool 112 may measure fewer processed workpieces than before. It should be understood that measuring the processed workpieces may comprise measuring one or more features or output characteristics (e.g., deposition thickness, etch depth, critical dimensions) of the processed workpieces.

Figure 3:
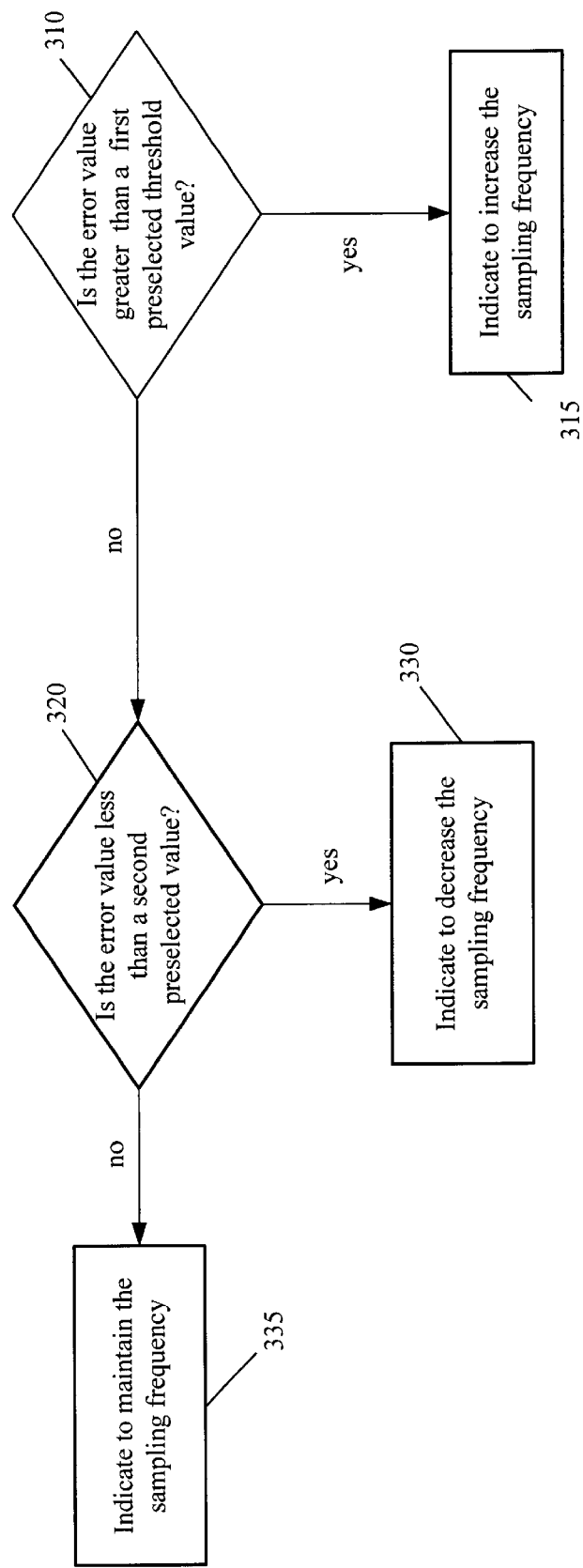
FIG. 3 illustrates a flow diagram of a method of adjusting the sampling protocol of processed workpieces in accordance with one embodiment of the present invention.

In FIG. 3, the sampling module 182 determines (at 310) if the error value (which was determined at block 225) is greater than a first preselected threshold value, and, if so, the sampling module 182 indicates to the dispatch module to increase (at 315) the sampling frequency. An increase in the sampling frequency may be desired because an error value higher than the first preselected threshold may indicate that the estimated process state values, which are utilized by the process controller 155 to determine the next control move, are not representative of the actual process states, and thus more measurements are needed to improve the process state estimation. In one embodiment, the sampling module 182, depending on the magnitude of the error value, may indicate to the dispatch module 114 the new sampling frequency that is desired. It should be understood that the particular value assigned to the first preselected threshold value will depend on the particular implementation.

If the error value is not greater than the first preselected threshold value (at 310), then the sampling module 182 determines (at 320) if the error value is less than a second preselected threshold value. If the error value is less than the second preselected threshold value, then the sampling module 182, in one embodiment, indicates (at 330) to the dispatch module 114 to decrease the sampling frequency. A decrease in the sampling frequency may be desired because an error value lower than the second preselected threshold can indicate that the estimated process state values are relatively close to the actual process state, and thus the number of measurements needed may be reduced without substantially adversely affecting the process state estimation. In an alternative embodiment, the sampling module 182 may not provide an indication to lower the sampling frequency until a plurality of error values are determined to be less than the second preselected threshold value. That is, the sampling frequency is lowered only after several consecutive error values (associated with several process runs) are lower than the second threshold value. In one embodiment, the sampling module 182, depending on the magnitude of the error value, may indicate to the dispatch module 114 the new sampling frequency that is desired. The particular value chosen for the second preselected threshold value will depend on the particular implementation.

If the error value is not greater than the first preselected threshold value and is not less than the second preselected threshold value, then, in the illustrated embodiment, the sampling module 182 may indicate to the dispatch module 114 that no change in the sampling frequency is desired. In an alternative embodiment, if it is determined that no change is desired in the sampling frequency, the sampling module 182 may provide no indication to the dispatch module 114, thereby indicating that the sampling module 182 should continue to sample at the previous sampling frequency (or some predefined default sampling frequency).

One or more embodiments of the present invention adjusts the sampling protocol as needed based on the process state estimation results, and, in particular, based on an error value associated with the process state estimation. For example, the sampling rate may be increased if a relatively large error is determined or it may be lowered if a relatively small error is determined. In other instances, the sampling protocol may not be altered if the determined error is neither relatively large nor small. By adjusting the sampling protocol as desired, an efficient and effective way of controlling the process to achieve the desired objectives is provided.

The various system layers, routines, or modules may be executable by the control unit 156 (see FIG. 1). As utilized herein, the term "control unit" may include a microprocessor, a microcontroller, a digital signal processor, a processor card (including one or more microprocessors or controllers), or other control or computing devices. The storage unit 157 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

receiving metrology data associated with one or more previously processed workpieces;

estimating a next process state based on at least a portion of the metrology data;

determining an error value associated with the estimated next process state;

processing a plurality of workpieces based on the estimated next process state; and adjusting a sampling protocol of the processed workpieces that are to be measured based on the determined error value.

2. The method of claim 1, wherein estimating the next process state comprises estimating the next process state based on a previous state estimate and a state space model.

3. The method of claim 2, wherein processing comprises etching a batch of semiconductor wafers.

4. The method of claim 1, wherein adjusting the sampling protocol comprises adjusting at least one of a number of the processed workpieces to be measured, a number of features formed on the processed workpieces that are to be measured, and a type of features to be measured.

5. The method of claim 4, wherein determining the error value comprises determining an error variance associated with the estimated next process state.

6. The method of claim 5, wherein adjusting the number of processed workpieces comprises increasing the number of processed workpieces that are to be measured if the error variance is greater than a preselected threshold value.

7. The method of claim 5, wherein adjusting the number of processed workpieces comprises decreasing the number of processed workpieces that are to be measured if the error variance is less than a preselected threshold value.

8. The method of claim 7, further comprising determining an error variance for each of a plurality of process runs, and wherein adjusting the number of processed workpieces comprises decreasing the number of processed workpieces that are to be measured if the error variance for each of the plurality of process runs is less than the preselected threshold value.

9. The method of claim 5, wherein adjusting the number of the processed workpieces that are to be measured comprises adjusting the number of processed workpieces that are to be measured for each process run.

10. The method of claim 1, wherein estimating the next process state comprises estimating a state of a processing tool for processing the plurality of workpieces.

11. An apparatus, comprising:
an interface adapted to receive metrology data associated with processing of workpieces; and
a control unit communicatively coupled to the interface, the control unit adapted to:
estimate a next process state based on at least a portion of the metrology data;
determine an error value associated with the estimated next process state;
process a plurality of workpieces based on the estimated next process state; and
adjust a sampling protocol of the processed workpieces that are to be measured based on the determined error value.

12. The apparatus of claim 11, wherein the control unit is adapted to process a plurality of semiconductor wafers and to estimate the next process state using a Kalman filter.

13. The apparatus of claim 11, wherein the control unit is adapted to estimate the next process state comprises estimating the next process state based on a previous state estimate.

14. The apparatus of claim 11, wherein the control unit is adapted to adjust at least one of a number of the processed workpieces to be measured, a number of features formed on the processed workpieces that are to be measured, and a type of measurements to be taken.

15. The apparatus of claim 14, wherein the control unit is adapted to determine the error value comprises determining an error variance associated with the estimated next process state.

16. The apparatus of claim 14, wherein the control unit is adapted to increase the number of processed workpieces that are to be measured if the error variance is greater than a preselected threshold value.

17. The apparatus of claim 14, wherein the control unit is adapted to decrease the number of processed workpieces that are to be measured if the error variance is less than a preselected threshold value.

18. The apparatus of claim 14, wherein the control unit is adapted to determine an error variance for each of a plurality of process runs and to decrease the number of processed workpieces that are to be measured if the error variance for each of the plurality of process runs is less than the preselected threshold value.

19. The apparatus of claim 11, wherein the control unit is adapted to estimate the next process state comprises estimating a state of a processing tool for processing the plurality of workpieces.

20. An apparatus, comprising:
means for receiving metrology data associated with processing of workpieces;
means for estimating a next process state based on at least a portion of the metrology data;
means for determining an error value associated with the estimated next process state;
means for processing a plurality of workpieces based on the estimated next process state; and
means for adjusting a sampling protocol of the processed workpieces that are to be measured based on the determined error value.

21. An article comprising one or more machine-readable storage media containing instructions that when executed enable a processor to:
receive metrology data associated with processing of workpieces;
estimate a next process state based on at least a portion of the metrology data;
determine an error value associated with the metrology data;
process a plurality of workpieces based on the estimated next process state; and
adjust a number of the processed workpieces that are to be measured based on the determined error value.

22. The article of claim 21, wherein the instructions when executed enable the processor to estimate the next process state based on a previous state estimate.

23. The article of claim 22, wherein the instructions when executed enable the processor to determine an error variance associated with the estimated next process state.

24. The article of claim 23, wherein the instructions when executed enable the processor to increase the number of processed workpieces that are to be measured if the error variance is greater than a preselected threshold value.

25. The article of claim 23, wherein the instructions when executed enable the processor to decrease the number of processed workpieces that are to be measured if the error variance is less than a preselected threshold value.

26. The article of claim 23, wherein the instructions when executed enable the processor to determine an error variance for each of a plurality of process runs and to decrease the number of processed workpieces that are to be measured if the error variance for each of the plurality of process runs is less than the preselected threshold value.

27. A system, comprising:
a controller adapted to:
eceive metrology data associated with processing of workpieces;
estimate a next process state based on at least a portion of the metrology data;
determine an error value associated with the estimated next process state; and
a processing tool to process a plurality of workpieces based on the estimated next process state, and
wherein the controller is adapted to adjust a number of the processed workpieces that are to be measured based on the determined error value.

28. The system of claim 27, wherein the controller is implemented within an advanced control process framework.

* * * * *